INVENTOR:
JACQUES, JEAN, EMILE
            MESNAGER
BY:

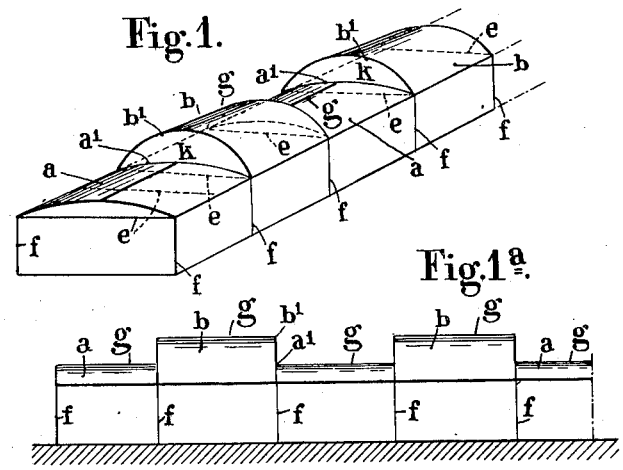
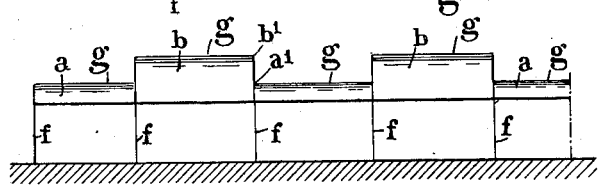
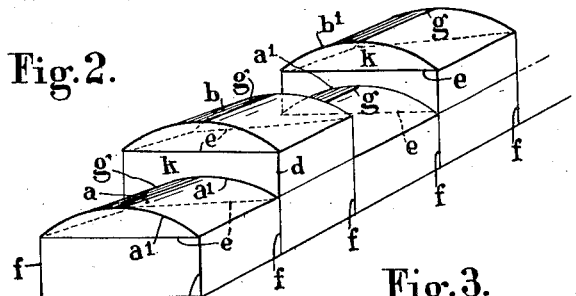
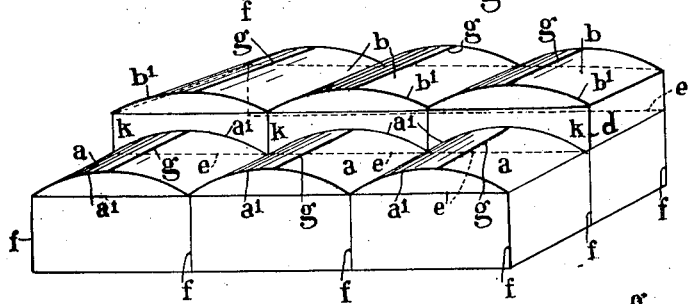
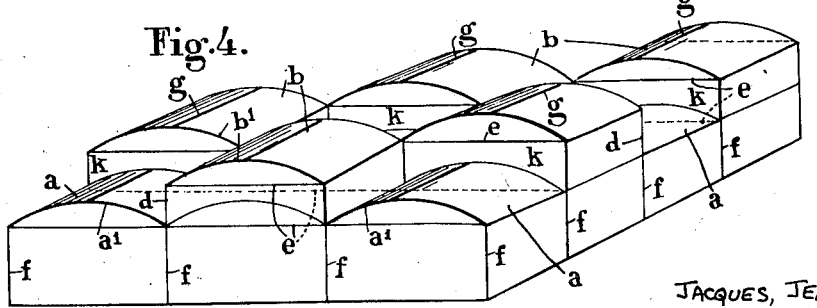

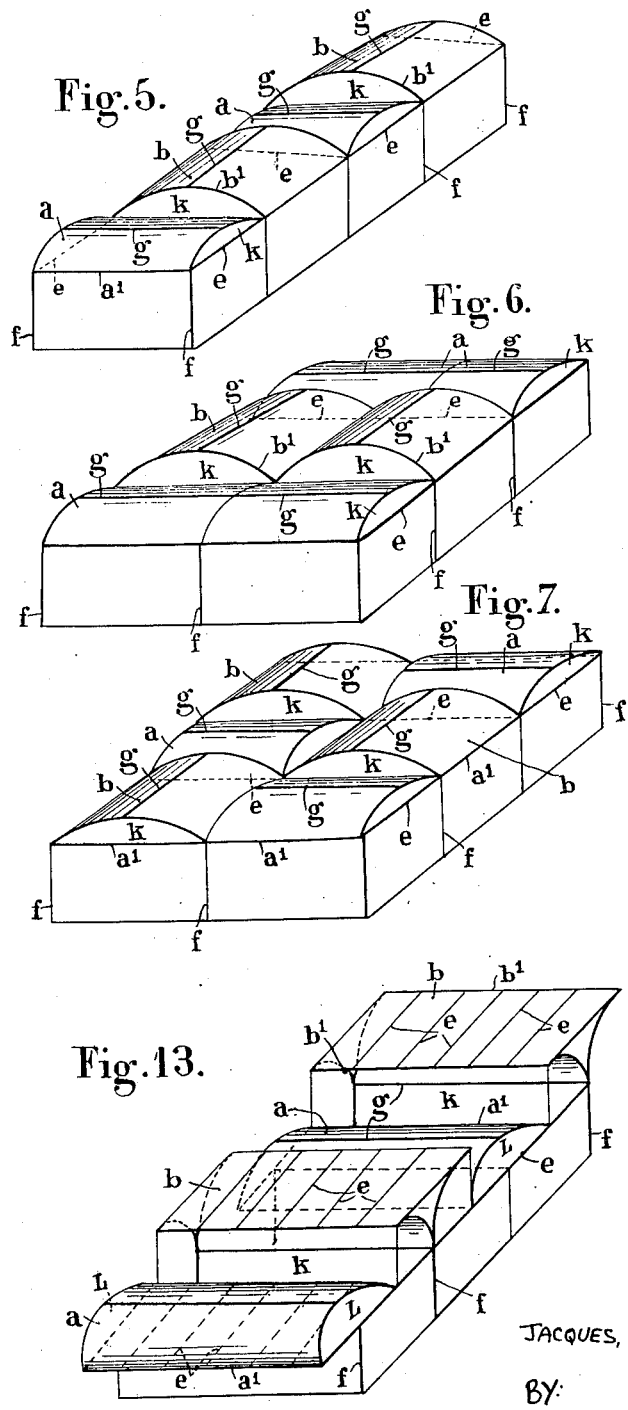

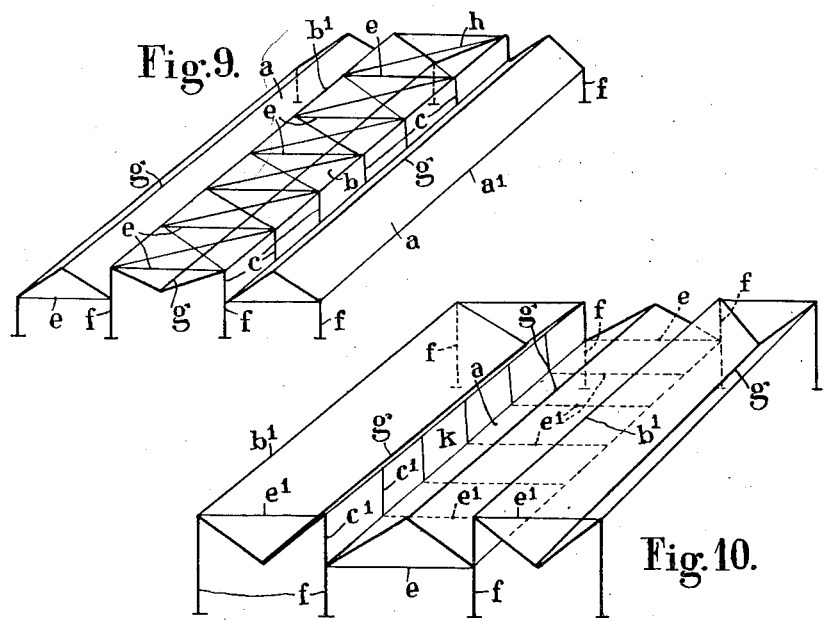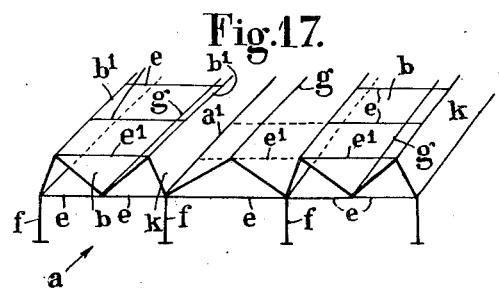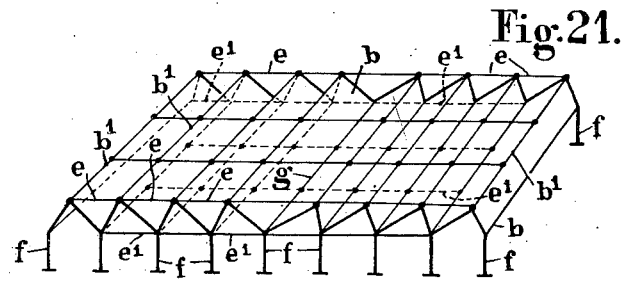

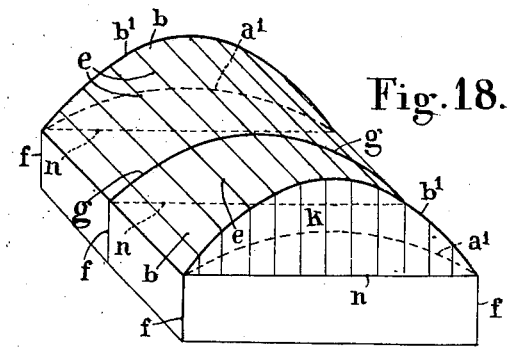
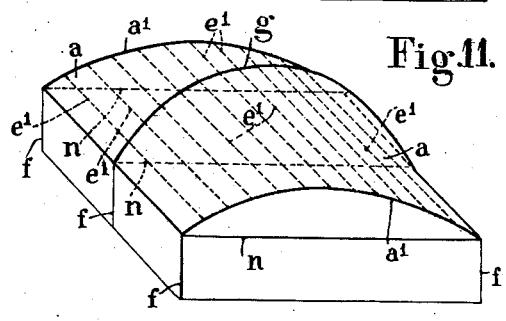
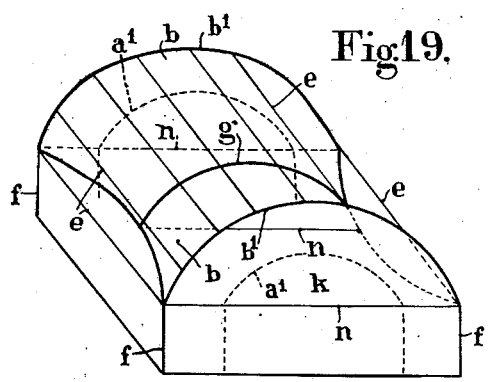
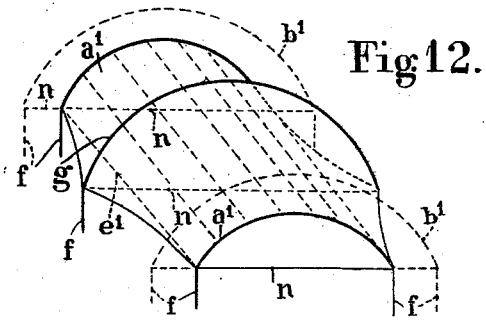

INVENTOR:
JACQUES, JEAN, EMILE,
MESNAGER
BY:

United States Patent Office 3,035,373
Patented May 22, 1962

3,035,373
ROOFING ARRANGEMENT
Jacques Jean Emile Mesnager, 182 Rue de Rivoli,
Paris, France
Filed Apr. 15, 1953, Ser. No. 348,934
Claims priority, application France July 25, 1945
4 Claims. (Cl. 50—12)

This invention relates to a roofing arrangement and has for its object a roofing embodying a combination of self-carrying roofing elements known per se, the said combination having for its purpose to provide a covering for a large area in such a manner that same will be well illuminated from the outside and is not crowded with numerous posts, such a result being obtained with the aid of a roofing that is light in weight and constructed at low cost.

This application is a continuation-in-part of application Serial No. 685,686 entitled Arrangement for Covering Buildings and filed July 23, 1946, and now abandoned.

The present invention consists in the construction of roofs of buildings by means of roofing supported by pillars, columns or walls and consisting of one or more rows of self-carrying elements, characterized that each of these elements consists of an arched surface or of two flat or curved surfaces each of which is capable of withstanding tangential forces but yields to perpendicular forces, the surfaces constituting each element meeting along a common generatrix, and the elements having ties or struts connecting their opposite outer edges, and the sequence of these elements being juxtaposed margins of adjoining elements in a row, either of which margins may be rectilinear or curvilinear, are on different levels so as to form a free space for lighting and ventilation.

It is to be understood that the cross-section of each element may be straight or curved, that is to say in form of a V and an inverted V with straight or curved sides.

Various embodiments of the roofing according to the invention are shown diagrammatically in perspective view in the accompanying drawings.

FIGURES 1 to 23 of the accompanying drawing represent an application of this invention to different types of constructions according to whether the self-carrying elements consist of flat or curved, symmetrical or non-symmetrical slopes working as a beam supported at the extremities of its horizontal ends.

FIGS. 1 and 1a are respectively a perspective view and a view in elevation of a row of self-carrying roofing elements $a$ and $b$, each element consisting of two curved cylindrical surfaces having horizontal generating lines parallel to the row, the two surfaces which constitute each of the elements $a$ and $b$ meeting along a common generating line $g$ and being connected by ties $e$ at their opposite outer edges. As seen from these figures the sequence of these elements is such that the curvilinear margins $a_1$ and $b_1$ of adjacent elements $a$ and $b$ are at different levels so as to leave a space K free for lighting or ventilation by reason of the difference in the curvature of these curvilinear boundaries $a_1$ and $b_1$. Vertical or inclined glass may enclose the spaces. The uprights supporting the structure are shown at $f$.

FIG. 2 illustrates a similar structure which differs from the preceding embodiment in that the space for lighting and ventilation is obtained by making the successive elements $a$ and $b$, which in this case are identical and have the same curvature, of different heights, the margins $a_1$ and $b_1$ being identical in contradistinction to the preceding embodiment in which the two curvilinear margins $a_1$ and $b_1$ had different curvatures which met at their origins.

FIG. 3 illustrates in perspective a structure in which a plurality of rows identical with those of the preceding embodiment have been put together, the higher elements $b$ being side by side with one another, and the lower elements $a$ also being side by side.

FIG. 4 illustrates in perspective a structure in which three rows of elements identical with those of FIG. 2 have been put together but with each row off-set by the width of one element.

FIG. 5 illustrates in perspective a structure in which a row consists of self-carrying roofing elements $a$ and $b$ each comprising two cylindrical surfaces having horizontal generating lines, the generating lines of element $b$ being perpendicular to those of element $a$.

The rectilinear margins $a_1$ of the elements are placed below the curvilinear margins $b^1$ of the elements $b$ so as to leave free spaces for lighting and ventilation.

FIG. 6 illustrates in perspective the juxtaposition of two rows of the type shown in FIG. 5, in which the elements $a$ of one row are adjacent to the elements $a$ of the other and the elements $b$ of one row to the elements $b$ of the other.

FIG. 7 illustrates in perspective the juxtaposition of two rows identical with that of FIG. 5, in which the elements $a$ of one row are adjacent to the elements $b$ of the other and vice versa. In this arrangement the free spaces K for lighting and ventilation between the rectilinear $a$, and curvilinear $b_1$ margins face in four directions in pairs whereas in the preceding structures they faced only in two directions in pairs.

Figure 8:
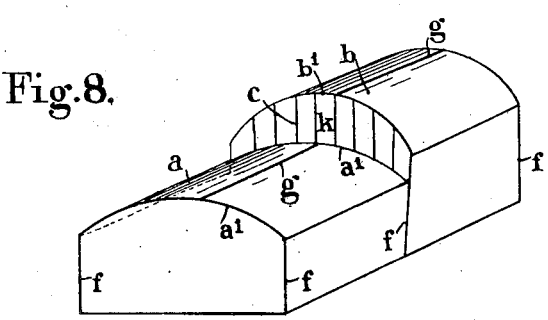

FIG. 8 is a view in perspective of a row which differs from that of FIG. 1 only in that the ties of the low and high elements respectively are concealed in or above the elements along the curvilinear margins $a_1$ of the lower elements $a$ and are suspended from the curvilinear margins $b_1$ of the upper elements $b$ by means of bars $c$. Thus, rows having no ties apparent inside the structure are obtained, which is advantageous from an architectural point of view.

FIG. 17 illustrates a structure in which the self-carrying elements $a$, which are supported only on four pillars $f$ placed at the corners, each consist of two plane surfaces assembled in the form of an inverted V in a similar manner as the slopes of a normal roof and connected along a horizontal generating line or ridge $g$ and by means of ties $e$ under great tension at their extremities, and by struts $e^1$ rigid to compression connecting the lower rectilinear margins $a_1$. The self-carrying elements $b$, also, each consist of two planes, assembled in the form of a V as in the case of a trough connected along a lower generating line $g$ and by struts $e^1$ rigid to compression at their extremities and by ties $e$ under tension connecting the upper rectilinear margins $b_1$. The inclined rectangular space $k$ between $a_1$, $b_1$ may be enclosed by glass.

FIG. 9 illustrates a structure similar to that of FIG. 17 but differing therefrom in that the struts $e^1$ rigid to compression are dispensed with, the lower boundaries $a_1$ being suspended from the upper margins $b_1$ by suspension means $c$. Diagonal straps $h$ connect the upper margins of $b$ in such a manner as to enable the elements $b$ to resist torsion which might be caused by a layer of snow on adjacent elements $a$.

FIG. 10 illustrates a structure similar to that of FIG. 17 but in which the ties $e$ of elements $b$ have been dispensed with and replaced by horizontal struts $e^1$ rigid to compression transmitting thrust from the upper margins $b_1$ to the lower margins $a_1$.

FIG. 13 illustrates in perspective a structure in which the self-carrying elements $a$ and $b$ of a row each consist of two cylindrical surfaces having horizontal generating lines and having in common the upper generating line $g$ in the case of elements $a$ and the lower generating line $g$ in the case of elements $b$. The lower rectilinear margins of $a$ are connected by ties $e$, as are also the upper rectilinear margins of the elements $b$. The elements $a$ are each supported on two uprights $f$ through the intermediary of partitions L forming beams supported on these uprights. The elements $b$ are each supported directly on two uprights $f$, their lower generating line $g$ resting on these uprights.

Figure 14:
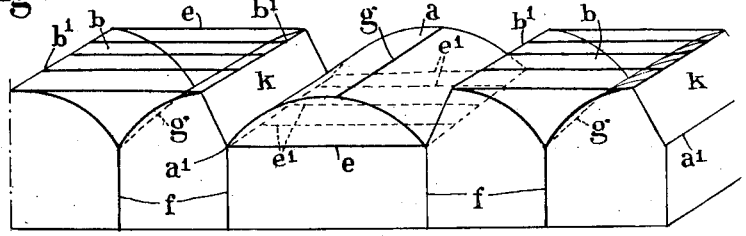

FIG. 14 illustrates in perspective a construction similar to the preceding embodiment but differing therefrom in that the elements $a$ are each supported on four uprights $f$ at the four corners, instead of two uprights only. In this case there are no partitions L but only ties $e$.

Figure 15:
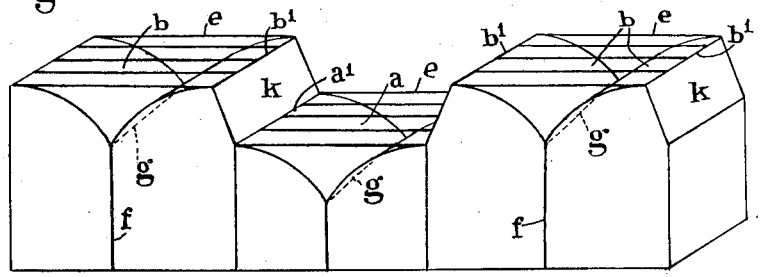

FIG. 15 illustrates a construction similar to that of FIG. 13 but differing therefrom in that the elements $a$ are identical with the elements $b$ of the last construction FIGURE 14 but are merely placed at different levels in such a manner as to admit light through the spaces K between $a_1$ and $b_1$.

Figure 16:
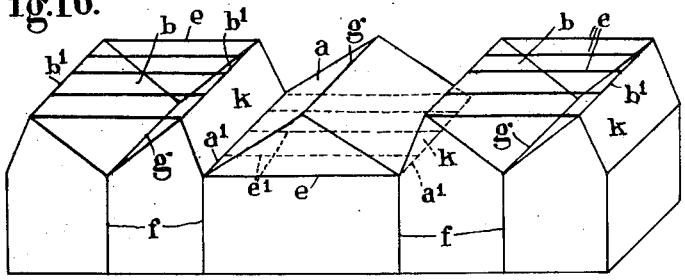

FIG. 16 also illustrates a construction similar to that of FIG. 17 but in which the elements $b$ are each supported only on two uprights $f$ instead of the four uprights $f$ in FIG. 17.

FIG. 11 illustrates a self-carrying element $a$ of row, which element is composed of two surfaces having a double curvature and being each in the form of a conoid having a vertical directing plane, these surfaces being connected directly along an upper generating curve $g$ and by struts $e^1$ connecting the curvilinear margins $a_1$. Ties $n$ connect the origins of these generating curves $g$ and those of the margins perpendicular to the uprights $f$.

FIG. 18 illustrates a self-carrying element $b$ of a row, which element also is composed of two surfaces $b$ having a double curvature and connected along a lower generaing curve $g$ and by ties $e$ connecting the upper margins $b_1$. Ties connect the origins of the generating curve $g$ and those of the margins perpendicular to the uprights $f$.

The elements $a$ and $b$ illustrated in FIGS. 11 and 18 are placed in sequence in such a manner as to constitute a row leaving spaces K free between the curvilinear margins $a_1$ and $b_1$ which spaces may be enclosed by glass.

FIG. 12 illustrates a self-carrying element $a$ of a row which element is composed of two surfaces having a double curvature (each having the form of a hyperboloid of one sheet having a horizontal axis) connected directly along a generating curve $g$ and by struts $e^1$ connecting the curvilinear margins. Ties $n$ connect the origins of the generating curves $g$ and of the boundary arcs of which the tangents are perpendicular to the uprights $f$.

FIG. 19 illustrates an element composed of two surfaces having a double curvature (each having the form of a hyperboloid of one sheet having a horizontal axis) connected directly by a generating curve $g$ and by ties $e$ connecting the upper curvilinear margins $b$. Ties $n$ connect the origins of the generating curves $g$ and those of the boundary arcs $b_1$ of which the tangents are in the vertical plane of the uprights $f$.

The elements $a$ and $b$ illustrated in FIGS. 12 and 19 are placed in sequence in such a manner as to constitute a row, producing free spaces K between the curvilinear margins $a_1$ and $b_1$.

Figure 20:
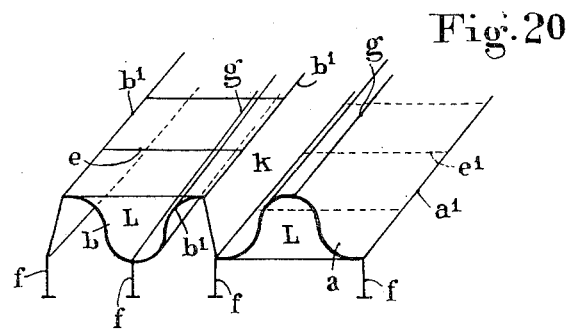

FIG. 20 illustrates a construction similar to FIG. 14, in which each self-carrying element instead of being composed of two cylindrical surfaces, of which the curvature is in the same direction, is composed of two halves each consisting of two cylindrical surfaces of which the concavities are directed successively upwards and downwards, the two halves being connected directly by a common upper generating line $g$ in the case of elements $a$ and a common lower generating line $g$ in the case of elements $b^1$ and by struts $e^1$ in the case of elements $a^1$ and ties $e$ in the case of elements $b$. Partitions L placed at the extremities render the profiles rigid and enable loads to be transmitted downwards to the uprights $f$.

FIG. 21 illustrates a construction in which the two plane surfaces constituting each self-carrying element are separate and are connected only by ties $e$ and struts $e^1$ rigid to compression at the lower extremities and also at both their upper edge ($b_1$) and their lower edge, except in the case of the central element of which the two lower edges are connected directly by a common generating line $g$. In the construction shown the central element $b$ is of V-shape and the element surfaces on both sides of it also correspond to the element surfaces $b$.

The construction resembles two series of shed-roofs (saw-tooth structure) put together back to back and symmetrical in relation to the vertical central plane, but differs therefrom in that it is self-carrying, i.e., the plane surfaces, which in an ordinary saw-tooth roofing structure have to be supported on numerous beams and uprights, are instead supported only on two rows of uprights $f$, leaving a large surface free, without employing any beams to support them.

Figure 22:
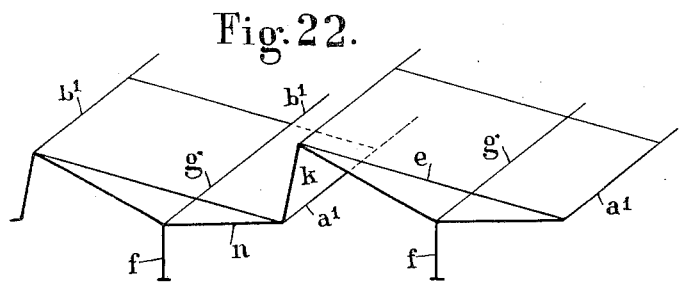

The construction illustrated in FIG. 22 consists of self-carrying elements each consisting of two plane surfaces having in common a lower generating line $g$ and connected by ties $e$ joining the upper edge of each element $b$, to the lower edge $a$, thereof.

The successive elements are all identical and by reason of their inclination the upper margin $b_1$ of an element is on a level higher than that of the lower margin $a^1$ of the other element, leaving a space for lighting which space can be enclosed by inclined or vertical glass.

Each element thus is similar to an element $b$ of FIG. 16 but is inclined and the combination of these elements has the advantage of a saw-tooth roof structure without intermediate beams or uprights.

Figure 23:
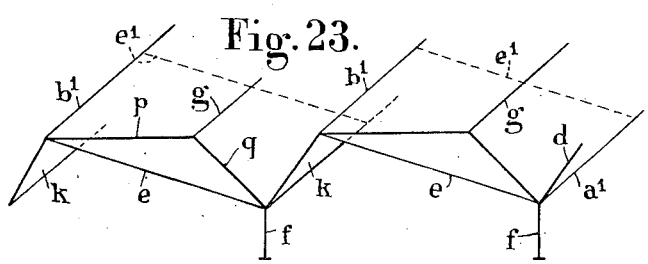

The construction illustrated in FIG. 23 is composed of self-carrying elements each consisting of two plane surfaces having in common an upper generating line $g$ and connected at their lower margins by struts $e^1$ rigid to compression and at the extremities by ties $e$ under tension which ties are supported on uprights $f$.

The unequal inclinations of the planes enables the outer margins $a_1$ and $b_1$ to be at different levels so that between the neighbouring edges $a_1$ and $b_1$ of two adjacent elements there remains spaces enabling light to pass through. These spaces may be enclosed by vertical or inclined glass $k$. The advantage of a saw-tooth roof construction, i.e. lighting in one direction only, is thereby obtained with self-carrying elements without intermediate beams or uprights. Each element is thus similar to an inverted-V element $b$ of FIG. 17.

What I claim is:

1. A roof for buildings or the like comprising, in combination, a plurality of self-sustaining independent elongated roof units having oppositely inclined faces and parallel longitudinal side edges, said roof units being arranged parallel to each other in side-by-side relation with their longitudinal side edges extending parallel to each other, each roof unit being inverted with respect to the next roof unit, so that the facing elongated parallel side edges of adjacent roof units are located at different levels adjacent to and spaced from each other; a plurality of intermediate non-load supporting at least partly transparent roof portions extending between adjacent free longitudinal side edges of said roof units and being connected thereto; and a plurality of supporting structures each supporting one of said roof units independently from the other roof units.

2. A roof as defined in claim 1 in which said parallel longitudinal side edges of alternating roof units are located in two substantially horizontal planes, respectively.

3. A roof for buildings or the like, comprising, in combination, a plurality of self-sustaining independent gable roof units arranged parallel to each other in side by side relation and all being located at the same elevation, each gable roof unit being inverted with respect to the next gable roof unit so that the facing side edges of adjacent gable roof units are located at different vertical levels, adjacent to and spaced from each other, each gable roof unit consisting of a pair of elongated, oppositely inclined sheet portions joined to each other along one side edge of each sheet portion and having free side edges, respectively, located distant from and at a different elevation than said joined side edges, and a plurality of beams each extending between and connected at its opposite ends to said free side edges, respectively, of the sheets of each gable unit; a plurality of intermediate non-load supporting roof portions and extending between adjacent free side edges of said gable roof units and being connected thereto; and a plurality of columns supporting each of said gable roof units independently from the other roof units.

4. A roof as defined in claim 3 and in which the vertical distance between the joined side edge of the oppositely inclined sheet portions and the plurality of beams is the same for all of said gable roof units.

References Cited in the file of this patent

UNITED STATES PATENTS

| Re. 15,133 | Ballinger et al. | June 20, 1921 |
| 1,229,478 | Kramer | June 12, 1917 |
| 2,239,399 | Randya | Apr. 22, 1941 |

FOREIGN PATENTS

| 447,437 | France | 1912 |
| 353,610 | Great Britain | July 30, 1931 |
| 726,846 | France | 1932 |
| 420,974 | Great Britain | Dec. 12, 1934 |
| 857,960 | France | Apr. 29, 1940 |
| 719,119 | Germany | Mar. 30, 1942 |
| 468,458 | Canada | Oct. 3, 1950 |